(12) United States Patent
Tanamoto et al.

(10) Patent No.: US 7,405,423 B2
(45) Date of Patent: Jul. 29, 2008

(54) RANDOM NUMBER GENERATING DEVICE

(75) Inventors: Tetsufumi Tanamoto, Kanagawa-Ken (JP); Shinobu Fujita, Kanagawa-Ken (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 885 days.

(21) Appl. No.: 10/373,874

(22) Filed: Feb. 27, 2003

(65) Prior Publication Data

US 2003/0162587 A1    Aug. 28, 2003

(30) Foreign Application Priority Data

Feb. 28, 2002    (JP) .............................. 2002-054153

(51) Int. Cl.
    *H01L 23/58* (2006.01)
(52) U.S. Cl. .................... 257/48; 257/E21.521; 463/22
(58) Field of Classification Search .................. 257/31, 257/14, 23, 314, 48; 438/257–258; 708/250; 463/22

See application file for complete search history.

(56) References Cited

U.S. PATENT DOCUMENTS

| 5,432,718 | A | * | 7/1995 | Molvig et al. .................. 703/9 |
| 6,057,556 | A | * | 5/2000 | Gubin et al. ................... 257/39 |
| 6,487,112 | B1 | * | 11/2002 | Wasshuber .................. 365/163 |
| 6,588,672 | B1 | * | 7/2003 | Usami ........................ 235/492 |
| 6,661,022 | B2 | * | 12/2003 | Morie et al. .................. 257/14 |
| 6,740,925 | B2 | * | 5/2004 | Yoo et al. ..................... 257/314 |
| 6,949,793 | B2 | * | 9/2005 | Choi et al. .................... 257/316 |
| 7,015,499 | B1 | * | 3/2006 | Zagoskin ....................... 257/31 |
| 7,105,425 | B1 | * | 9/2006 | Krivokapic .................. 438/481 |

OTHER PUBLICATIONS

Tetsufumi Tanamoto, "Quantum gates by coupled asymmetric quantum dots and controlled-NOT-gate operation", Physical Review A, The American Physical Society, XP-002361445, vol. 61, No. 2, Jan. 12, 2000, pp. 022305-1-022305-7.
Thomas Jennewein, et al., "A fast and compact quantum random number generator", Review of Scientific Instruments, American Institute of Physics, XP-012038219, vol. 71, No. 4, Apr. 2000, pp. 1675-1680.
Daniel Loss, et al., "Probing Entanglement and Nonlocality of Electrons in a Double-Dot via Transport and Noise", Physical Review Letters, XP-00231446, vol. 84, No. 5, Jan. 31, 2000, pp. 1035-1038.
Tetsufumi Tanamoto, "One- and two-dimensional N-qubit systems in capacitively coupled quantum dots", Physical Review A, The American Physical Society, XP-002361447, vol. 64, No. 6, Nov. 13, 2001, pp. 062306-1-062306-5.
U.S. Appl. No. 10/373,874, filed Feb. 27, 2003, Tanamoto et al.
U.S. Appl. No. 10/661,593, filed Sep. 15, 2003, Yasuda et al.

* cited by examiner

*Primary Examiner*—Wai-Sing Louie
(74) *Attorney, Agent, or Firm*—Oblon, Spivak, McClelland, Maier & Neustadt, P.C.

(57) ABSTRACT

The objective is to provide a random number generating device having a smaller circuit size and a smaller value of output bias. The random number generating device includes a pair of first and second current paths arranged in parallel with each other, and a pair of first and second fine particles, which can mutually exchange charges, and are located in the vicinity of the first and second current paths.

12 Claims, 10 Drawing Sheets

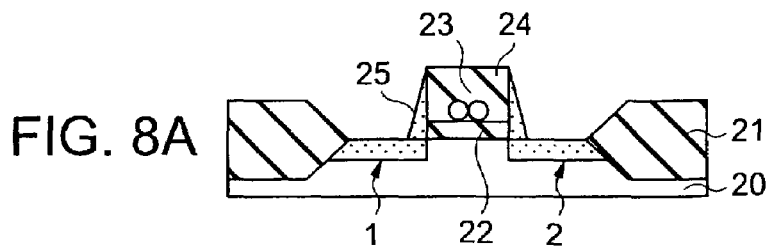
FIG. 8A
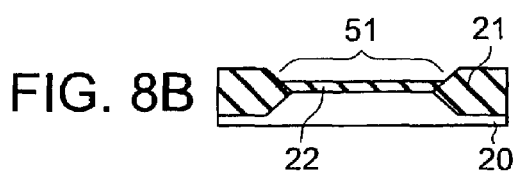
FIG. 8B
FIG. 8H
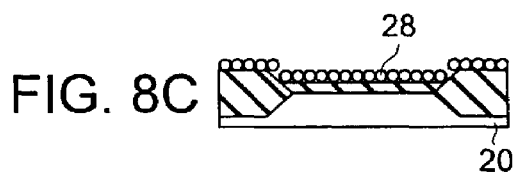
FIG. 8C
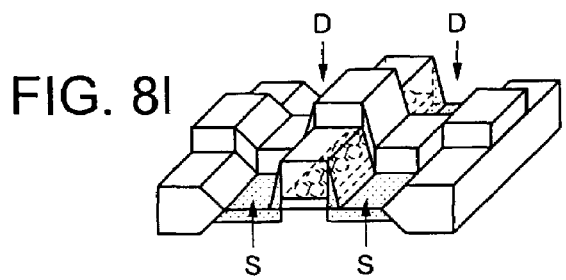
FIG. 8I
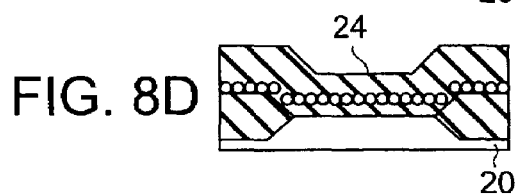
FIG. 8D
FIG. 8E
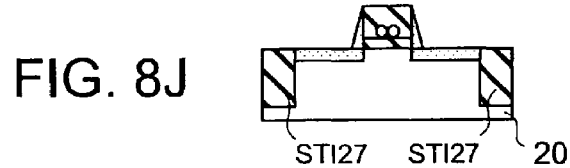
FIG. 8J
FIG. 8F
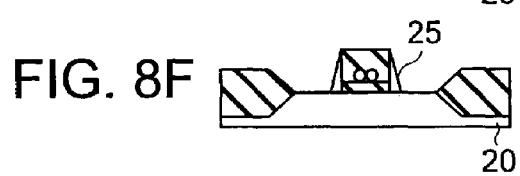
FIG. 8G
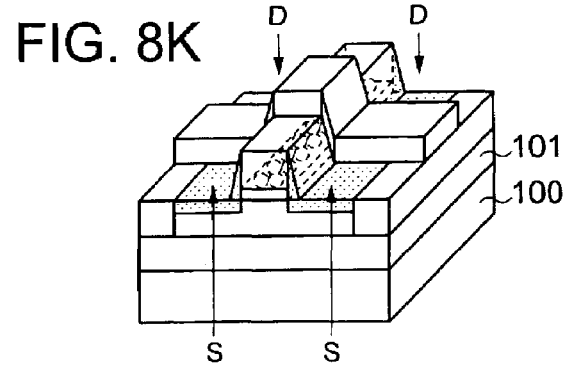
FIG. 8K
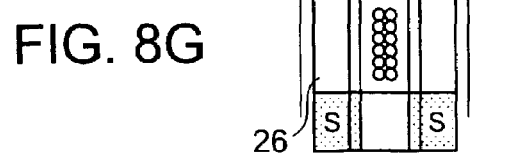

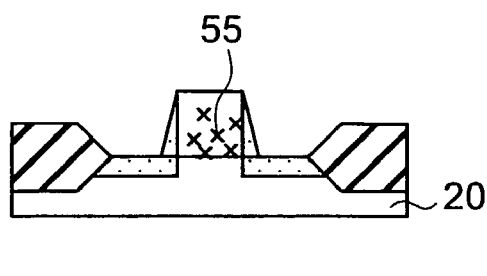
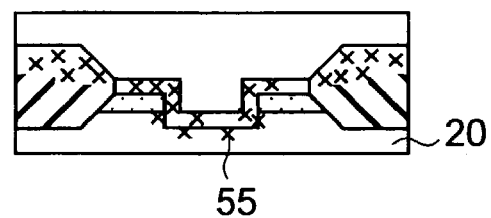
FIG. 16A          FIG. 16B
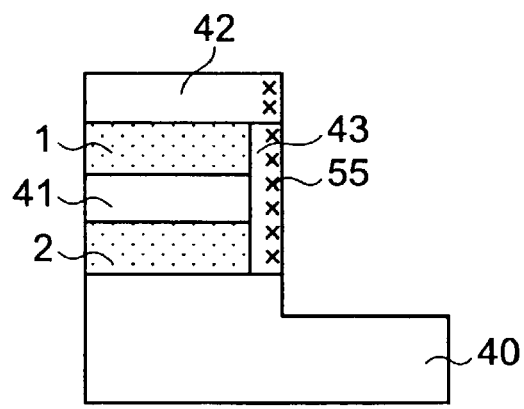
FIG. 16C

RANDOM NUMBER GENERATING DEVICE

CROSS-REFERENCE TO RELATED APPLICATIONS

This application is based upon and claims the benefit of priority from the prior Japanese Patent Application No. 2002-54153, filed on Feb. 28, 2002, the entire contents of which are incorporated by reference herein.

BACKGROUND OF THE INVENTION

1. Field of the Invention

The present invention relates to a random number generating device.

2. Related Background Art

As a result of the improvement in information communication networks, such as Internet, commercial transactions such as bank payments are carried out through information communication networks. As such opportunities increase, a demand for higher security arises, resulting in that various kinds of cryptosystems are developed.

In such cryptosystems, it is necessary to generate high-quality random numbers in order to improve the security level. The term "high-quality" means that there is no periodicity in random numbers, that it is impossible to predict the random numbers, etc.

Conventionally, random numbers have been generated by the use of calculating software such as a shift register. However, since the random number generated in such a manner are pseudo-random numbers, if there are considerably many numbers, a periodicity appears, thereby decreasing the security level.

In order to generate high-quality true random numbers, there are methods in which physical random numbers are generated based on physical phenomena such as thermal noises. Such physical random numbers are true random numbers in principle. Therefore, these methods are ultimate methods of generating random numbers.

A device generating random numbers by amplifying thermal noise signals of a diode is proposed in the above-described methods. In this device, a very subtle thermal noise of the diode is amplified by using various kinds of amplifiers. Accordingly, in order to generate high-quality random numbers, the circuit size inevitably becomes large.

Further, in this device, random numbers should be generated based on the diode current/voltage characteristics. Accordingly, the outputs are often biased.

Moreover, as the processing speed of semiconductor chips is increased, the speed at which random numbers are generated should also be increased.

Thus, conventional random number generating devices have problems in that the circuit size thereof is large, and the outputs thereof are biased.

SUMMARY OF THE INVENTION

The present invention is proposed in consideration of the above problems, and the object of the present invention is to provide a random number generating device having a smaller circuit size, and a smaller value of output bias.

A random number generating device according to the first aspect of the present invention includes: a pair of first and second current paths arranged in parallel with each other; and a pair of first and second fine particles which are located in the vicinity of said first and second current paths, and which can mutually exchange charges, at least one of the first and second fine particles being electrically connected to one of the first and second current paths.

It is preferable that the first and second fine particles are located between the first and second current paths.

Further, it is preferable that the energy level including the charging energy of a charge in the first and second fine particles is discrete.

Moreover, it is preferable that the diameter of the first and second fine particles is 100 nm or less.

In addition, it is preferable that an odd number pairs of first and second fine particles are provided along the direction of the currents flowing through the first and second current paths.

A random number generating device according to the second aspect of the present invention includes: a pair of first and second current paths arranged in parallel with each other; an insulating layer formed between the first and second current paths; and a nanoparticle having a diameter of 1 μm or less located in the insulating layer, at least one of a capacitance of a first capacitor including the first current path, the insulating layer, and the nanoparticle and a capacitance of a second capacitor including the second current path, the insulating layer and the nanoparticle being 1 nF or less.

It is preferable that plasma oscillation occurs in the nanoparticle, and the plasma frequency of the nanoparticle is $1/10$ or more of the frequency of fluctuations of the currents flowing through said first and second current paths, and ten times the frequency of fluctuations of the currents flowing through said first and second current paths or less.

Further, the insulating layer may include a first insulating layer located between the first current path and the nanoparticle, and a second insulating layer located between the second current paths and the nanoparticle.

It is preferable that there are an odd number of nanoparticles.

A random number generating device according to the third aspect of the present invention includes: a pair of first and second current paths arranged in parallel with each other; and a layer including a plurality of trap levels formed between the first and second current paths, the trap levels being able to mutually exchange charges, the trap levels being electrically coupled with at least one of the first and second current paths.

The term "parallel" does not necessarily mean that the current paths are collimated.

BRIEF DESCRIPTION OF THE DRAWINGS

FIG. 5A is a section view; FIG. 5B is a section view; and FIG. 5C is a perspective view.

FIGS. 8A to 8K show the random number generating device according to the first example of the present invention. FIG. 8A is a section view; FIGS. 8B to 8F and 8H are section views showing the main fabricating steps; FIG. 8G are a top view; FIG. 8I is a perspective view; FIG. 8J is a section view of a modification; and FIG. 8K is a perspective view of the modification.

FIG. 9A is a section view; FIGS. 9C to 9E are section views showing the main fabricating steps; FIGS. 9B and 9F are top views; FIG. 9G is a perspective view; and FIGS. 9H to 9J are section views of a modification.

FIG. 10A is a section view; FIGS. 10B to 10F are section views showing the main fabricating steps; and FIG. 10G is a top view.

FIGS. 16A to 16C are section views of random number generating devices according to other examples of the present invention.

DESCRIPTION OF THE EMBODIMENTS

Hereinafter, embodiments of the present invention will be described with reference to the accompanying drawings. It should be noted that the present invention is not limited to the following embodiments, but can be modified in various ways.

First Embodiment

Figure 1:
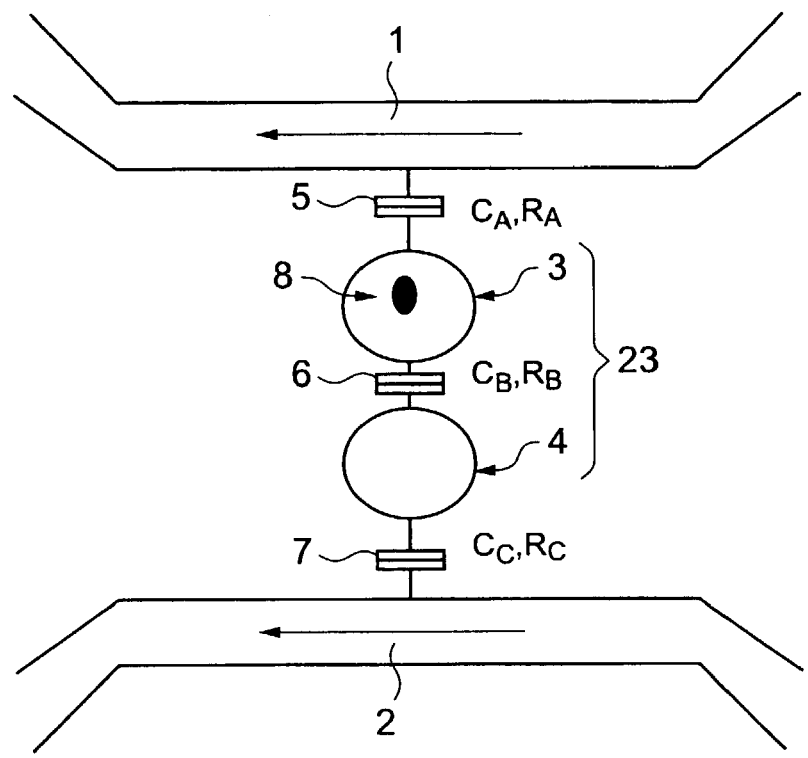
FIG. 1 is a conceptual diagram of a random number generating device according to the first embodiment of the present invention.

FIG. 1 is a conceptual view of a random number generating device according to the first embodiment of the present invention.

As shown in FIG. 1, the random number generating device includes a pair of first current path 1 and second current path 2, which are placed in parallel with each other, and a pair of first nanoparticle 3 and second nanoparticle 4, which are capable of exchanging electric charges, and are located between the first current path 1 and the second current path 2.

The size of the first nanoparticle 3 and the second nanoparticle 4 is sufficiently small to enjoy the effects of the wave function of charges. For example, the diameter of the nanoparticles is 100 nm or less. Such nanoparticles are called "quantum dots." In a quantum dot, the energy level including charging energy of a charge is discrete.

Further, the first nanoparticle 3 and the second nanoparticle 4 are electrically coupled via a tunnel barrier 6 having a capacitance of $C_B$ and a resistance of $R_B$, and charges can be transferred between them.

Moreover, the first nanoparticle 3 and the first current path 1 are electrically coupled via a barrier 5 having a capacitance of $C_A$ and a resistance of $R_A$; and the second nanoparticle 4 and the second current path 2 are electrically coupled via a barrier 7 having a capacitance of $C_C$ and a resistance of $R_C$.

It is assumed that a pair of quantum dots 23, which is formed by coupling the first nanoparticle 3 and the second nanoparticle 4, is locally not within the conditions of electrical neutrality. That is, it is assumed that an extra charge 8 is injected into the pair of quantum dots 23 from the first current path 1 or the second current path 2, or that the pair of quantum dots 23 is polarized. This state can be achieved if the formulas $R_A \gg R_B$ and $R_C \gg R_B$ hold, and charges are transferred more easily within the pair of quantum dots 23, i.e., between the first nanoparticle 3 and the second nanoparticle 4, than between the current paths and the pair of quantum dots 23.

This random number generating device is achieved based on the fact that when the diameters of the first nanoparticle 3 and the second nanoparticle 4 are on the order of nanometers, the probability that a charge such as an electron exists within the first nanoparticle 3 or the second nanoparticle 4 varies with the physical uncertainty. A physical random number can be generated by observing the effect of the charge distribution, which shifts with the physical uncertainty, on the currents flowing through the first current path 1 and the second current path 2.

For example, it is assumed that the capacitance of a miniaturized structure is $C \sim \epsilon_0 S/d$, where S is the maximum section area of the miniaturized structure viewed from a direction parallel to the two current paths, d is the minimum length between two structures (quantum dots), and $\epsilon_0$ is the dielectric constant.

Assuming that two silicon nanoparticles having a diameter of 10 nm, which serve as the first nanoparticle 3 and the second nanoparticle 4 described above, are located with a distance of 2.5 nm, the capacitance is about 2.2 aF ($10^{-18}$ F). In this case, the charging energy per electron is about 36 meV.

The charging energy per electron of 36 meV is sufficiently higher than the thermal fluctuation energy of 25.8 meV at the room temperature of 300 K. Accordingly, in the pair of quantum dots 23, the changes in charge distribution can be observed at the room temperature. This phenomenon is generally called "Coulomb Blockade."

Assuming that the resistance existing when a charge is transferred between localized levels is R, time $\Delta t_d$ in which a charge is stabilized in a localized level is estimated to be $\Delta t_d \sim 1/(C \cdot R)$.

For example, if the tunnel resistance $R_B$ between the first nanoparticle 3 and the second nanoparticle 4 is $10^6 \, \Omega$ and the Coulomb Blockade effect can be observed, $\Delta t_d$ is about $4.5 \times 10^{-11}$ seconds. Here, the resistance R with which the Coulomb blockade effect can be observed is estimated to be 25.8 kΩ or more, and the capacitance C is estimated to be 2.2 aF.

In FIG. 1, if a current flows through, e.g., the first current path 1, the charge distribution within the first nanoparticle 3 changes due to the Coulomb repulsion from the electrons of the current flowing through the first current path 1, so that an electron 8 is rearranged so as to go away from the current flowing through the first current path 1.

It is assumed that the current path is a source-drain path between a silicon FET. Assuming that the mobility between the source and the drain is μ, and the electric field applied between the source and the drain is E, the velocity v of a charge within the current flowing through the path between the source and the drain is given by v=μE.

Assuming that the diameter of the first nanoparticle 3 and the second nanoparticle 4 is $l_d$, time $\Delta t_f$ in which a charge flowing trough the first current path 1 passes in the vicinity of the first nanoparticle 3 and the second nanoparticle 4 is estimated to be $\Delta t_f \sim I_d/V = Id/(\mu E)$. If one of $\Delta t_d$ and $\Delta t_f$ is less than ten times the other, the current detects the rearrangement of electron within the pair of quantum dots. That is, the ratio between $\Delta t_d$ and $\Delta t_f$ is 1/10 or more and 10 or less. In addition, this can be achieved if one of the two values is 1,000 times the other or less. That is, the ratio between $\Delta t_d$ and $\Delta t_f$ is 1/1000 or more and 1000 or less.

If it is assumed, for example, that the mobility $\mu$ is 1000 $cm^2/(Vs)$, and the electric filed E is $10^6$ cm/s, the velocity of electron is $10^{15}$ nm/s. Accordingly, if the diameter of the first nanoparticle 3 is 10 nm, time $\Delta t_f$ in which an electron passes in the vicinity of the first nanoparticle 3 is $10^{-13}$ seconds, and there is a strong interaction between the charge distribution within the first nanoparticle 3 and the current flowing through the first current path 1.

At this time, the charge distribution within the first nanoparticle 3 fluctuates due to the current flowing through the first current path 1, and the fluctuations in charge distribution is reflected back in the current flowing through the first current path 1, so that the current temporally fluctuates. Here, the second current path 2 is located in the vicinity of the second nanoparticle 4 and the values of the currents flowing through the first current path 1 and the second current path 2 are adjusted to be substantially on the same order. In order to adjust the values of the currents so as to be substantially on the same order, the first current path 1 and the second current path 2 are designed so as to be formed of the same material, and to have substantially the same section area, and the same voltage is applied to both of them.

Since the state of charge within the pair of quantum dots 23, i.e., within the first nanoparticle 3 and the second nanoparticle 4 varies depending on the situations, each time it is measured, the difference between the currents flowing through the first current path and the second current path is uniformly distributed in the plus or minus region near zero.

Figure 2:
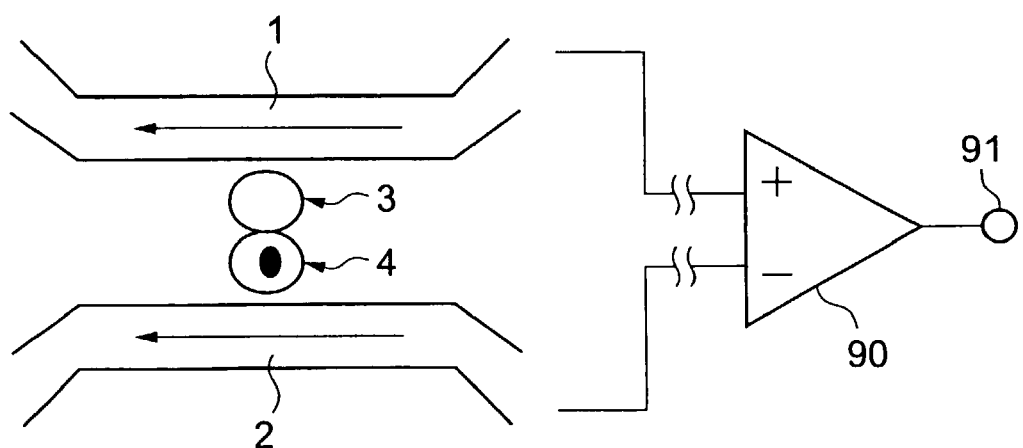
FIG. 2 is another conceptual diagram of a random number generating device according to the first embodiment of the present invention.

Thus, as shown in FIG. 2, if the difference between the currents flowing through the first current path 1 and the second current path 2 is transferred to a differential amplifier 90, it is possible to obtain random numbers as current values in consideration of the state before the currents flow through the first current path 1 and the second current path 2.

FIG. 2 shows, in a simplified manner, the differential amplifier 90, which amplifies the difference between the current flowing through the first current path 1 and the current flowing through the second current path 2, and outputs the result from an output terminal 91.

In the manner as described above, physical random numbers can be generated by a physical phenomenon.

In this physical phenomenon, since the current values fluctuate in the plus or minus region in the vicinity of zero, the deviation between "0" and "1", which often occurs in a random number generating device for amplifying thermal noises from, e.g., a diode, is inherently unlikely to occur.

Further, as is understood from the calculation of $\Delta t_d$ described above, it is possible to achieve the operation speed on the order of picoseconds ($10^{-12}$ seconds) or less just by adjusting the distance between the first nonoparticle 3 and the second nanoparticle 4.

In the random number generating device according to this embodiment, changes in quantum wave function have a strong influence. The act to observe the charge distribution of the pair of quantum dots 23, i.e., the first nanoparticle 3 and the second nanoparticle 4, mainly brings about the convergence of the wave packet of the wave function.

Accordingly, random numbers generated by the random number generating device according to this embodiment are physical random numbers using quantum fluctuations, which are not predictable in a quantum manner. Therefore, even if the number of the pairs of nanoparticles increases, no periodicity appears.

Figure 3:
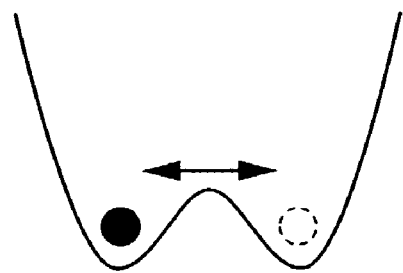
FIG. 3 shows the potential of a pair of quantum dots.

FIG. 3 schematically shows the potential of the quantum dot pair 23.

The movement of charges in the quantum dot pair 23 is expressed by the Schroedinger equation (T. Tanamoto, Physical Review A Vol. 61, p022305 (2000)).

Electrons come and go between the two quantum dots in a cycle depending on the height and the thickness of the tunneling barrier between the quantum dots. In which of the two quantum dots (the first nanoparticle 3 and the second nanoparticle 4) a charge exists cannot be predicted with certainty by the observation using the first current path 1 or the second current path 2 placed nearby.

This is the nature of the quantum theory. What is predictable is the square of the amplitude of the wave function, i.e., the probability of existence of a charge in each of the two quantum dots. If the two quantum dots have the same electromagnetic potential structure, the probability of the existence of a charge is the same for both two quantum dots.

Accordingly, random numbers can be generated by observing which of the two quantum dots has a charge, and setting "0" when one of them has a charge, and "1" when the other has a charge. In this case, each quantum dot is not necessarily in the ground level, but it is possible to be in an excitation state due to the thermal effect.

Figure 4:
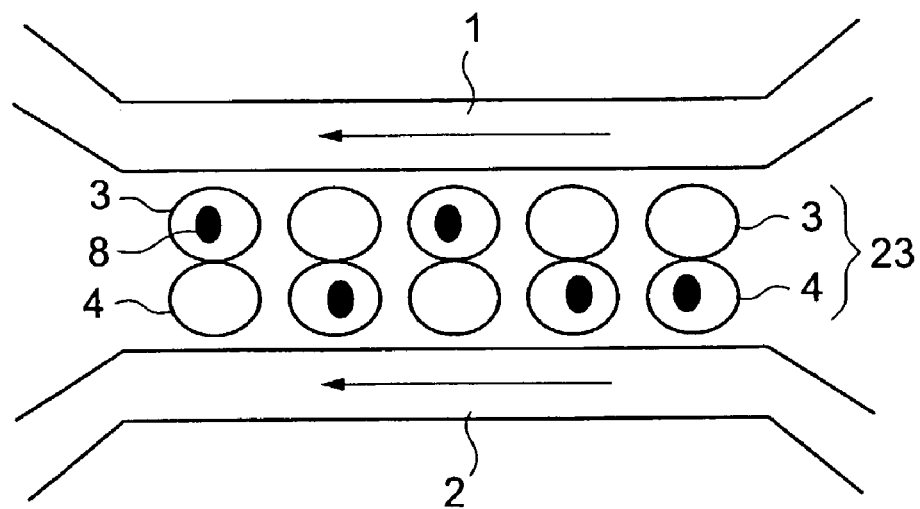
FIG. 4 shows that an odd number pairs of quantum dots each having a first nanoparticle 3 and a second nanoparticle 4 are arranged between a first current path 1 and a second current path 2.

FIG. 4 shows that an odd number pairs of quantum dots 23 each having a first nanoparticle 3 and a second nanoparticle 4 are arranged between the first current path 1 and the second current path 2. In each quantum dot pair, the probabilities of the appearance of the "0" current and the "1" current are about the same in average.

Even if the speed of a charge in a current flowing through the first current path 1 or the second current path 2 is slow, and the effect of the polarization in the quantum dot pair 23 is averaged, if there are odd number pairs of quantum dots 23, the first current path 1 and the second current path 2 has the effect of either "0" or "1" current without fail.

If there are three or more pairs of quantum dots 23, the Coulomb force acts thereon so that the distribution of charge is opposite in the adjacent two quantum dot pairs 23. Accordingly, it is possible to further inhibit the deviation of distribution in one direction in the quantum dots.

Further, even if any of the quantum dot pairs does not function, or only one of the quantum dots has the deviation of charge, the random number generating device in this embodiment can function since it has a plurality of quantum dot pairs.

Second Embodiment

Next, a random number generating device according to the second embodiment of the present invention will be described with reference to FIGS. 5A to 5C.

In this embodiment, the effect of the interaction between the temporal changes in potential distribution of a capacitance network, the charge state of which is not stable, and the temporal fluctuations in current is mainly used.

Figure 5A:
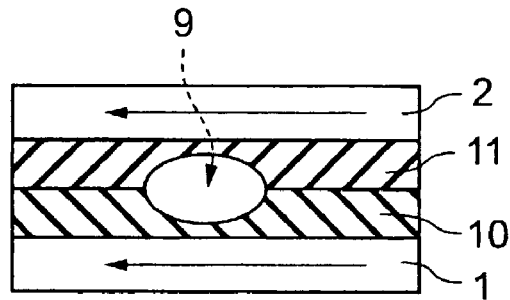
FIGS. 5A to 5C show a random number generating device according to the second embodiment of the present invention.

As shown in FIG. 5A, the random number generating device includes a pair of first current path 1 and second current path 2 arranged in parallel with each other, a microparticle 9 which has a diameter of 1 μm or less and is located between the first current path 1 and the second current path 2, a first insulating layer 10 located between the microparticle 9 and the first current path 1, and a second insulating layer 11 located between the microparticle 9 and the second current path 2.

With such a structure, at least one of a first capacitance constituted by the first current path 1, the first insulating layer 10, and the microparticle 9, and a second capacitance constituted by the second current path 2, the second insulating layer 11, and the microparticle 9 is 1 nF or less.

Figure 5B:
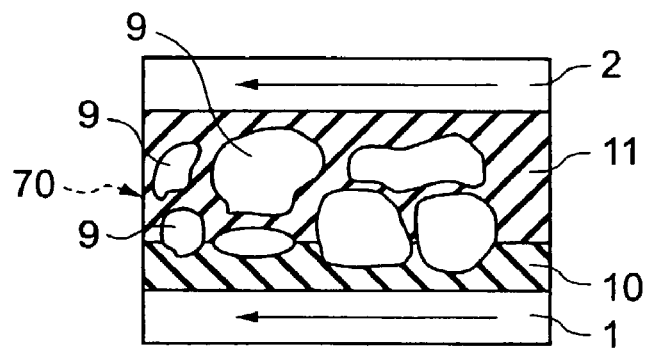

FIG. 5B shows that there are a plurality of microparticles 9 between the first current path 1 and the second current path 2. In this case, the Coulomb interaction acts between charges existing in the first current path 1 and the second current path 2 and charges existing in the microparticles 9. Due to the Coulomb interaction, the currents flowing through the first current path 1 and the second current path 2 and the charge distribution within the microparticles 9 temporally fluctuate.

In this case, even if the quantum effect of the microparticles 9 is not remarkable, the Coulomb interaction acting between charges of the microparticles 9 also causes temporal fluctuations of the currents flowing through the first current path 1 and the second current path 2 and the charge distribution within the microparticles 9.

In order to observe fluctuations in charge distribution as a current, it is required that at least one of the capacitance of the microparticle 9 and the current paths 1 and 2, and the capacitance of the microparticles 9 is 1 nF or less.

The number of the insulating layers between the first current path 1 and the second current path 2 can be one, or three or more.

Figure 5C:
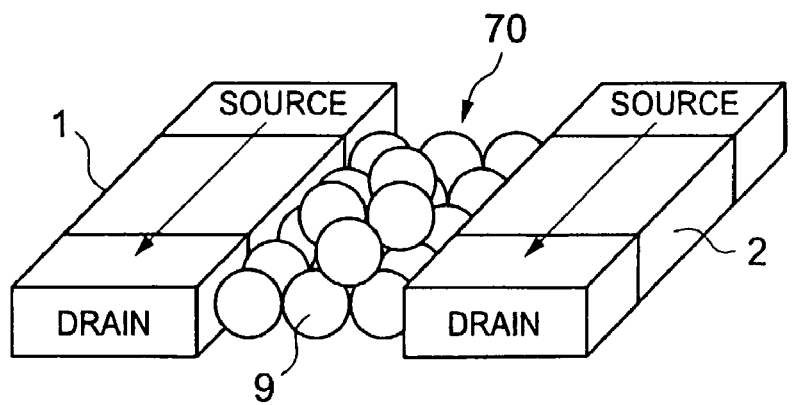

FIG. 5C shows the case where air is used as an insulating layer between the first and second current paths and the microparticles 9.

The principle of this is as follows.

The current flowing through either the first current path 1 from a first source to a first drain or the second current path 2 from a second source to a second drain changes the charge distributions of the microparticles 9, thereby exerting an influence on the other current path. If the current flowing through one current path increases, the current flowing through the other current path is inhibited due to the Coulomb repulsion. Since this phenomenon may temporally change due to thermal fluctuations, etc., it is possible to obtain high-quality random numbers if the fluctuations are outputted as "0"s and "1"s.

The intervals of quantum energy levels of the microparticles used in the random number generating device according to this embodiment should not necessarily be observed at a predetermined temperature. The fluctuations in current paths are caused by the temporal fluctuations of the location of minority charges due to the interactions among the minority charges or between the minority charges and the current paths.

In this case, however, the degree of the fluctuations of the charges is estimated on the order of the magnitude of charge energy of the capacitor. Accordingly, the less the capacitance of some portions in the microparticles 70 is, the greater the effect obtained is.

Third Embodiment

Next, a random number generating device according to the third embodiment of the present invention will be described.

In this embodiment, the effect of the strong interaction between the current paths and the charges in the material placed between the current paths to fluctuate the current values is used in the case where there is not a big difference between the plasma frequency inherent to the material placed between the current paths and the degree of temporal fluctuations of currents.

Figure 6A:
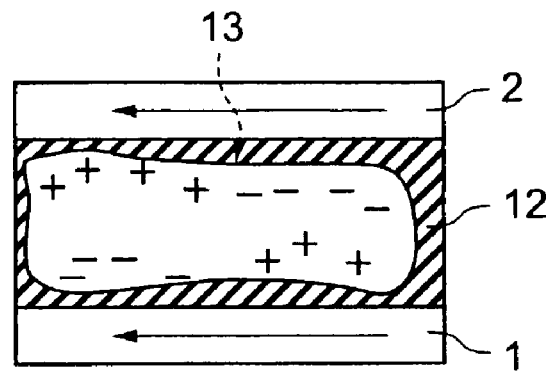
FIGS. 6A and 6B show the structure of a random number generating device according to the third embodiment of the present invention.

FIG. 6A shows the structure of a random number generating device according to this embodiment.

In this embodiment, there is a structure 13 between the first current path 1 and the second current path 2. The structure 13 is either charged or polarized, and the cycle of the plasma oscillation is about the same as time $\Delta t_I$ (the above-described formula) in which an electron in the currents flowing through the first current path 1 and the second current path 2 pass by a region corresponding to the charge distribution in the structure 13. In this manner, there is a strong interaction between the fluctuations of the charges in the structure 13 and the fluctuations of the electrons flowing through the current paths 1 and 2.

Thus, the changes in the charge distribution of the structure 13 and the currents flowing through the first current path 1 and the second current path 2 become to be in sync with each other, resulting in that the fluctuations of currents occur. Since the fluctuations in the first current path 1 and those in the second current path 2 are reverse to each other, it is possible to obtain high-quality random numbers.

FIG. 6A shows that plasma oscillation occurs in the structure 13 between the first current path 1 and the second current path 2 of the random number generating device of this embodiment. The structure 13 includes microparticles having a diameter of about 1 μm or less covered by an insulating layer 12.

Figure 6B:
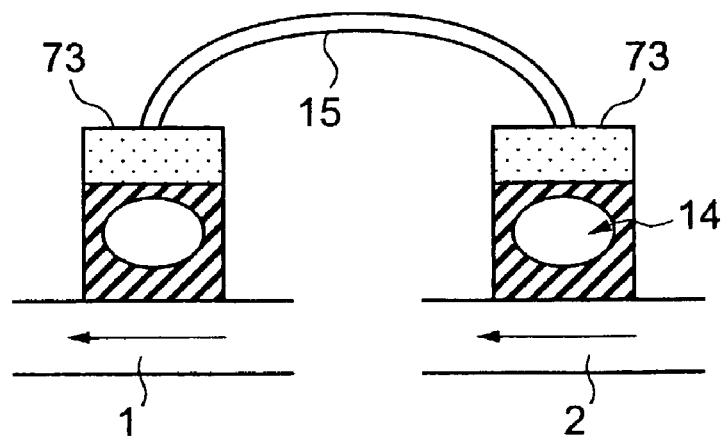

Besides this, as shown in FIG. 6B, there is a case where nanoparticles 14 having a diameter of about 100 nm or less are located near the first current path 1 and the second current path 2 and electrically connected with each other by a wiring 15. The wiring 15 is electrically connected with each nanoparticle 14 via an insulating layer 73. In this case, there are a macroscopic number of electrons between the nanoparticles 14, the plasma frequency of which is significantly different from the temporal fluctuations of the current flowing through the wiring 15. However, if the plasma frequency of the wiring 15 is not significantly different from the frequency of the fluctuations in the first current path 1 and the second current path 2, a correlation between the first current path 1 and the second current path 2 occurs, which can be effectively used for generating random numbers.

Fourth Embodiment

Next, a random number generating device according to the fourth embodiment of the present invention will be described.

In this embodiment, there are a plurality of trap levels between the current paths. If the degree of the temporal fluctuations of a charge moving among the trap levels is not significantly different from the degree of the temporal fluctuations of the currents flowing through the current paths, there is a strong interaction between the current paths and the charges in a material placed therebetween, thereby fluctuating current values. This embodiment uses the above-described effect.

Figure 7:
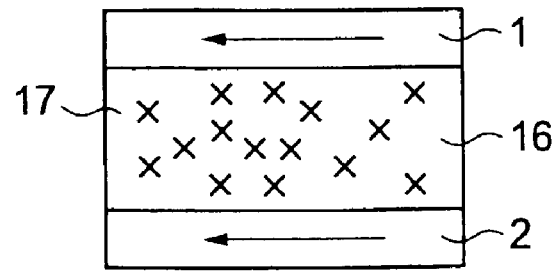
FIG. 7 is a section view of a random number generating device according to the fourth embodiment of the present invention.

As shown in FIG. 7, there is a layer 16 including trap levels 17 between the first current path 1 and the second current path 2. Charges may be sequentially transferred from the first current path 1 or the second current path 2 to the trap levels 17. Alternatively, a considerable amount of charges may be injected at the initial stage.

As a result of an interaction between the first current path 1 and the second current path 2 caused by the temporal fluctuations of the charges of the trap levels 17, high-quality random numbers are generated.

The trap levels can be generated by injecting Ga, B, Si, W, etc., into an insulating layer by the use of FIB (Focused Ion Beam).

Hereinafter, the structures of the random number generating devices according to the present invention will be specifically described.

FIGS. 8A to 16C show that the random number generating devices of the first to the fourth embodiments of the present invention are formed on a silicon substrate. If the size of particles is sufficiently small to cause the quantum effect, the effect explained in the descriptions of the first embodiment can be achieved.

If the size of particles is not uniform, and some of the particles are relatively large, the effect explained in the descriptions of the second embodiment can also be achieved.

If the size of the particles becomes further larger, the effect explained in the descriptions of the third embodiment becomes dominant.

If some kinds of trap levels exist in the insulating layer or the like, the effect explained in the descriptions of the fourth embodiment can be achieved. In the random number generating devices shown in FIGS. 13, 14, and 15, the effect of the fourth embodiment can be achieved.

FIRST EXAMPLE

FIG. 8A shows the section view of the random number generating device according to the first example. A current flows in the direction perpendicular to the sheet of paper.

In the random number generating device, an insulating layer 22 is formed on a silicon substrate 20. Silicon nanoparticles 23 are formed on the insulating layer 22. The silicon nanoparticles 23 are covered by an oxide layer 24. At the sides of the insulating layer 22 and the oxide layer 24, two sidewall fine lines 25 are formed.

The two sidewall fine lines 25 serve as the first current path 1 and the second current path 2. The silicon nanoparticles 23 are located between the two sidewall fine lines 25. Charges can transfer from/to the two silicon nanoparticles 23, which constitute the pair of quantum dots 23.

The method of fabricating this device is as follows.

First, as shown in FIG. 8B, device isolation regions 21 are formed on the silicon substrate 20 to form a device region 51. Then, thermal oxidation of the surface of the silicon substrate 20 is performed to form the silicon oxide layer 22 having a thickness of 10 nm or less. The silicon substrate 20 may be of either n-type or p-type.

Next, as shown in FIG. 8C, silicon quantum dots 28 are formed by first forming a polysilicon layer through CVD, etc., and then annealing the polysilicon layer.

Then, as shown in FIG. 8D, the oxide layer 24 having a thickness of about 8 nm is formed through CVD, etc.

Thereafter, as shown in FIG. 8E, the oxide layer 24 is patterned by the use of an exposing apparatus. It is preferable that after the patterning, the remaining portion includes one or more silicon quantum dots 28.

Subsequently, as shown in FIG. 8F, a polysilicon layer is formed through CVD, etc., and the sidewall fine lines 25 are formed at both the sides of the portion containing the silicon quantum dots 28 by removing the polysilicon layer.

Then, as shown in FIG. 8G, masks are formed on the portions separating the sources (S) and the drains (D) of the first current path 1 and the second current path 2 with a positive photoresist, etc. FIG. 8G illustrates the device region viewed from the top of the substrate.

Subsequently, as shown in FIG. 8H, ion implantation is performed to form the sources (S) and the drains (D) serving as contact regions for the currents. At this time, if the silicon substrate 20 is of n-type, boron, etc. is used, and if the silicon substrate 20 is of p-type, phosphorus etc., is used. FIG. 8I is a perspective view of FIG. 8H.

Next, an external differential amplifier is connected to the device. The sidewall fine lines 25 serve as the first current path 1 and the second current path 2 used to detect the effect of the charge distribution of the adjacent quantum dots.

Nanoparticles such as polystyrene beads can be used as the quantum dots 28. Further, metal fine particles such as Au can also be used.

Further, instead of the quantum dots 28, an amorphous silicon layer can be used. Since there are many trap levels in amorphous silicon, it can be used as a substitute for the pair of quantum dots 23.

In this case, there is no guarantee that pairs of quantum dots are regularly aligned along the current paths. However, if the current paths are sufficiently longer in view of the size of the quantum dots, it can be said that the distribution of quantum dots detected by the two current paths is uniform.

FIG. 8J is a section view in the case where STI (Shallow Trench Isolation) 27 is used for isolating devices.

FIG. 8K is a perspective view in which an SOI substrate 100 is used instead of the substrate 200. In the case where the SOI substrate 100 is used, the portion into which ions are injected can reach the oxide layer 101 in the substrate.

SECOND EXAMPLE

Figure 9A:
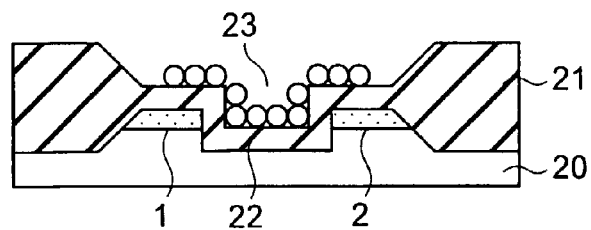
FIGS. 9A to 9J show the random number generating device according to the second example of the present invention.

FIG. 9A is a section view of the random number generating device according to the second example. Currents flow in the direction perpendicular to the paper plane.

In this random number generating device, an insulating layer 22 is formed on a silicon substrate 20. Silicon microparticles 23 are formed on the insulating layer 22. Under the insulating layer 22 on the silicon substrate 20, the first current path 1 and the second current path 2 are formed. The silicon microparticles 23 are arranged between the first current path 1 and the second current path 2.

The method of fabricating this device is as follows.

Figure 9B:
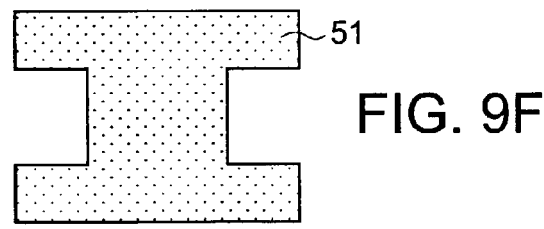

First, as shown in FIG. 9B, a device region 51 is formed on the silicon substrate 20 so as to have recessed portions. FIG. 9B is a top view. The recessed portions are not indispensable, since they are for effectively detecting the changes in electric field of the quantum dots. A conduction region is formed by injecting ions to the device region 51. The types of ions to be injected are the same as those for the first example.

Figure 9F:
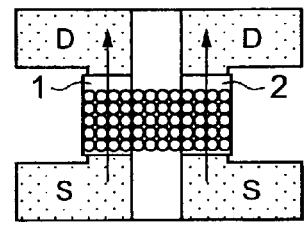
Figure 9C:
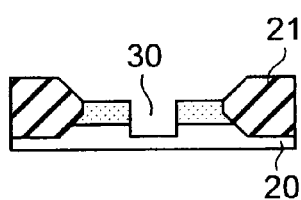

Next, as shown in FIG. 9C, a trench 30 is formed by exposing the center portion of the device region by the use of an electron beam exposing apparatus, and etching the silicon substrate 20.

Figure 9G:
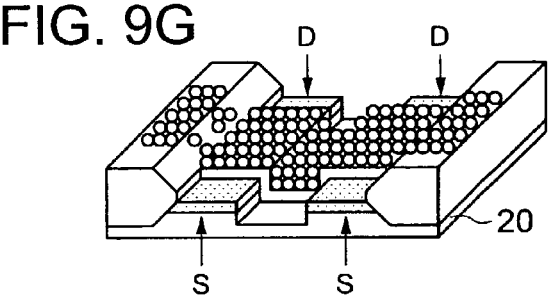
Figure 9D:
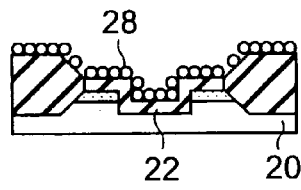

Then, as shown in FIG. 9D, the entire surface is oxidized to form an oxide layer 22. Thereafter, a polysilicon layer is formed on the oxide layer 22 through CVD, etc., to form silicon quantum dots 28, as in the case of the first example. FIG. 9G is a perspective view of the device in FIG. 9D. FIG. 9F is a top view of the device in FIG. 9D.

Figure 9H:
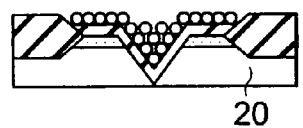
Figure 9E:
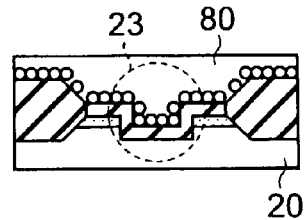

Subsequently, as shown in FIG. 9E, an oxide layer 80 is deposited through CVD, etc., and a contact hole is formed to form a current terminal. In FIG. 9E, the circled portion has an effect of quantum dot pairs 23.

As in the case of the first example, quantum dots of a material other than polysilicon can also be used.

Further, as shown in FIG. 9H, the trench 30 can be formed by anisotropic etching utilizing, e.g., the plane direction of the silicon substrate 20.

Figure 9I:
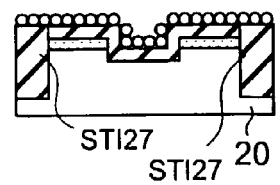

Further, FIG. 9I is a section view in which STIs 27 are used for isolating devices.

Figure 9J:
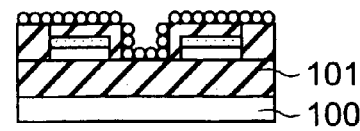

Moreover, FIG. 9J is a section view in which an SOI substrate 100 is used. In the case where the SOI substrate 100 is used, the portion into which ions are injected can reach the oxide layer 101 in the substrate.

THIRD EXAMPLE

Figure 10A:
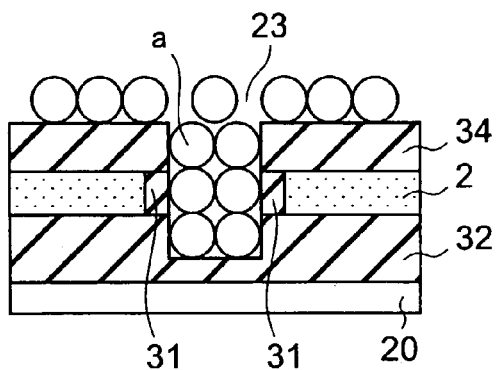
FIGS. 10A to 10G show the random number generating device according to the third example of the present invention.

FIG. 10A is a section view of the random number generating device according to the third example. Currents flow in the direction perpendicular to the paper plane.

In this random number generating device, silicon nanoparticles 9 are filled in a trench, and the first current path 1 and the second current path 2 are formed at both sides of the trench via an insulating layer 31. The first current path 1 and the second current path 2 are formed on a silicon oxide layer 32. A pair of silicon nanoparticles 9 constitutes the coupled quantum dots 23.

The method of fabricating this device is as follows.

Figure 10B:
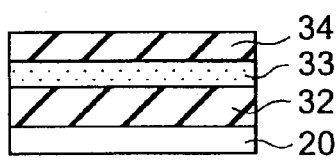

First, as shown in FIG. 10B, a silicon oxide layer 32 having a thickness of a few hundreds nm or more is formed on a silicon substrate 20. Then, a polysilicon layer 33 is formed on the silicon oxide layer 32. The polysilicon layer 33 will serve as the first current path and the second current path later. Subsequently, a silicon oxide layer 34 is formed on the polysilicon layer 33 through CVD, etc.

Figure 10C:
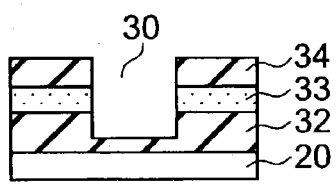

Thereafter, as shown in FIG. 10C, part of the silicon oxide layer 34, the polysilicon layer 33, and the silicon oxide layer 32 is patterned to form a trench 30.

Figure 10D:
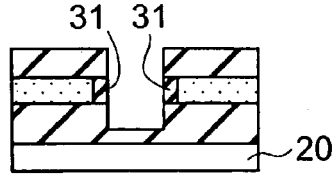

Then, as shown in FIG. 10D, a thin oxide layer 31 is formed on the inner sidewall of the trench 30 through thermal oxidation.

Figure 10E:
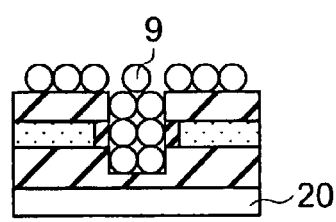

Subsequently, as shown in FIG. 10E, silicon quantum dots 9 are formed of polysilicon, etc., in the trench 30.

Figure 10F:
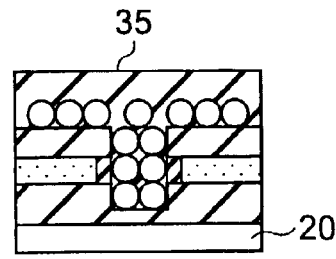

Then, as shown in FIG. 10F, a protection oxide layer 35 is formed through CVD, etc.

Figure 10G:
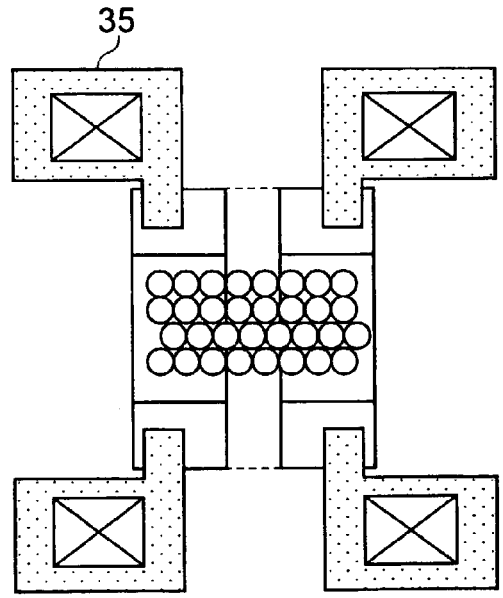

Subsequently, as shown in FIG. 10G, contacts are formed toward the first current path and the second current path. FIG. 10G is a top view of the device.

FOURTH EXAMPLE

Figure 11:
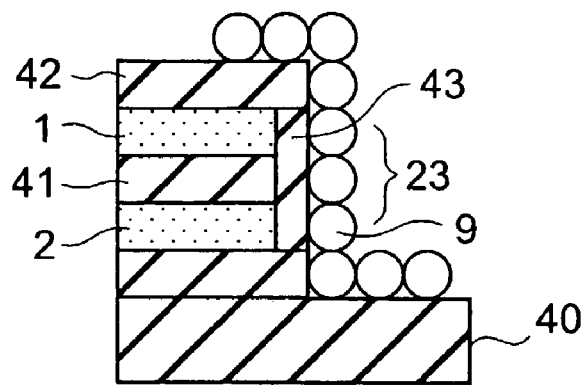
FIG. 11 is a section view of a random number generating device according to the fourth example of the present invention.

FIG. 11 is a section view of the random number generating device according to the fourth example. Currents flow in the direction perpendicular to the paper plane.

In this random number generating device, the second current path 2 is formed on an insulating layer 40. The first current path 1 is formed on the second current path 2 via an insulating layer 41. An insulating layer 42 is formed on the first current path 1. The first current path 1 and the second current path 2 have end portions formed by etching, at which a sidewall insulating layer 43 is formed. Silicon fine particles 9 are formed on the sidewall of the sidewall insulating layer 43. These silicon fine particles constitute quantum dots 23.

With such a structure, charges can be transferred within the coupled quantum dots 23. Since the charge distribution has an influence on the first current path 1 and the second current path 2, random numbers can be generated.

The above-described structure can be achieved by patterning part of laminated layers formed by laminating the insulating layer 40, the second current path 2, the insulating layer 41, and the first current path 1, oxidizing the angled portion, and depositing the silicon fine particles 23 on the angled portion.

FIFTH EXAMPLE

Figure 12:
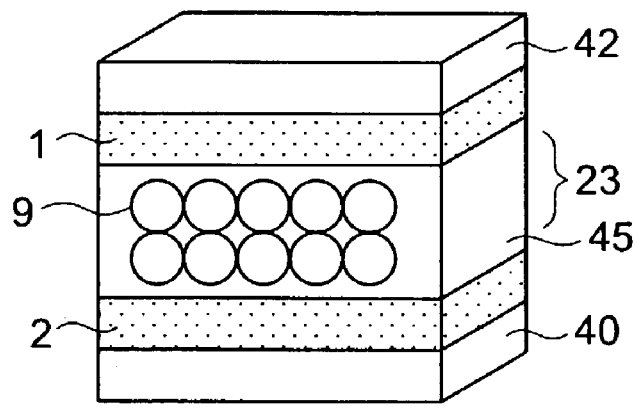
FIG. 12 is a section view of a random number generating device according to the fifth example of the present invention.

FIG. 12 is a section view of a random number generating device according to the fifth example.

In this random number generating device, the second current path 2 is formed on a silicon thermal oxide layer 40 obtained by heating the substrate. Pairs of quantum dots 23 are formed on the second current path 2 by embedding silicon fine particles 9 in a silicon oxide layer 45 formed through CVD. The first current path 1 is formed on the pairs of quantum dots 23. A silicon oxide layer 42 is formed on the first current path 1 through CVD.

This structure can be achieved by laminating the silicon thermal oxide layer 40, the second current path 2, the pairs of quantum dots 23 obtained by embedding silicon fine particles 9 in the silicon oxide layer 45, the first current path 1, and the silicon oxide layer 42, and performing patterning thereof.

SIXTH EXAMPLE

Figure 13:
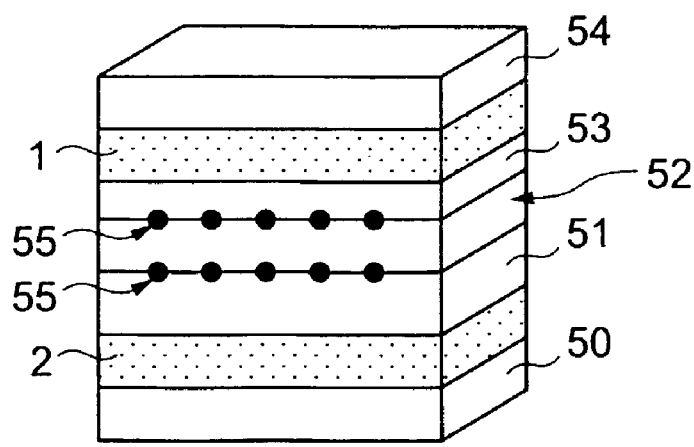
FIG. 13 is a section view of a random number generating device according to the sixth example of the present invention.

FIG. 13 is a section view of a random number generating device according to the sixth example.

In this random number generating device, the second current path 2 is formed on a silicon thermal oxide layer 50 obtained by heating a substrate. A silicon oxide layer 51 is formed on the second current path 2 through CVD. A silicon nitride layer 52 is formed on the silicon oxide layer 51. A silicon oxide layer 53 is formed on the silicon nitride layer 52 through CVD. The first current path 1 is formed on the silicon oxide layer 53. A silicon oxide layer 54 is formed on the first current path 1 through CVD.

At the interfaces between the silicon nitride layer 52 and the silicon oxide layer 51, and between the silicon nitride layer 52 and the silicon oxide layer 53, trap levels 55 are formed. The trap levels are formed between the first current path 1 and the second current path 2.

SEVENTH EXAMPLE

Figure 14:
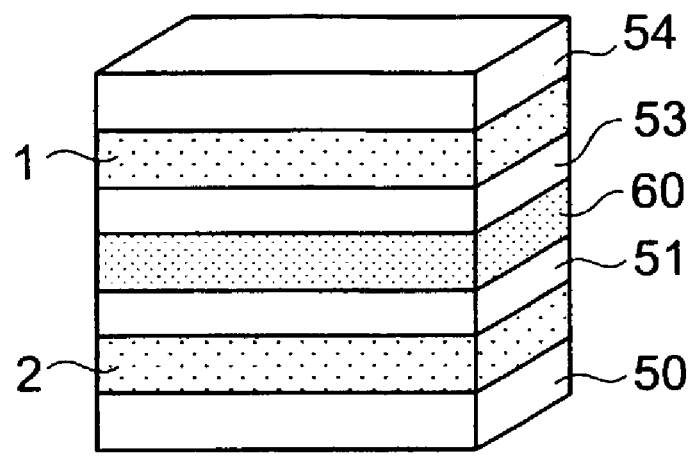
FIG. 14 is a section view of a random number generating device according to the seventh example of the present invention.

FIG. 14 is a section view of a random number generating device according to the seventh example.

In this random number generating device, the second current path is formed on a silicon thermal oxide layer 50 obtained by heating a substrate. A silicon oxide layer 51 is formed on the second current path 2 through CVD. An amorphous silicon layer 60 is formed on the silicon oxide layer 51. A silicon oxide layer 53 is formed on the amorphous silicon layer 60 through CVD. The first current path 1 is formed on the silicon oxide layer 53. A silicon oxide layer 54 is formed on the first current path 1 thorough CVD.

The amorphous silicon layer 60 has grain boundaries, part of which serves as quantum dots. Further, since trap levels exist at grain boundaries of the amorphous silicon layer 60, the trap levels can be used.

EIGHTH EXAMPLE

Figure 15:
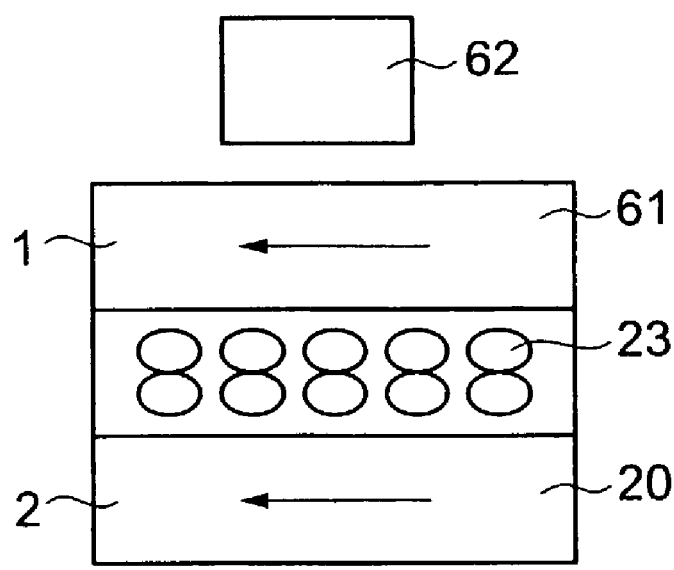
FIG. 15 is a section view of a random number generating device according to the eighth example of the present invention.

FIG. 15 is a section view of a random number generating device according to the eighth example.

In this random number generating device, pairs of quantum dots 23 covered by a thermal oxide layer are formed on a silicon substrate 20. A silicon layer 61 is formed thereon.

The surface of the silicon substrate 20 serves as the second current path 2. The silicon layer 61 serves as the first current path.

This structure can be achieved by laminating silicon on a silicon thermal oxide layer obtained by heating the substrate with the epitaxila technique, and then crystallizing it to form the first current path 1. In case the crystallization of the silicon layer 61 is not sufficiently performed, a gate electrode 62 is formed thereon. The gate electrode 62 is used to adjust the current amount of the first current path 1 and the second current path 2.

Hereinafter, other examples will be described.

In FIGS. 16A, 16B, and 16C, the quantum dots in the first, second, and fourth examples are replaced by trap levels 55 formed by injecting ions of Ga, B, Si, W, and the like by Focused Ion Beam (FIB). The rest of the structure is the same as the first, second, and fourth examples.

The trap levels may reach the substrate. Further, it is possible to form trap levels between the silicon substrate and the thermal oxide layer by roughening the surface of the silicon substrate by using KOH or the like without using FIB.

In the above-described examples, the first current path and the second current path are formed of polysilicon. However, instead of polysilicon, a silicide material such as CoSi, FeSi, NiSi, TiSi, etc. can be used in order to improve the conductivity.

Moreover, the first current path and the second current path can be formed of a metal such as Al, Fe, Ti, Ni, Co, and Cu.

In addition, although a single material is used for the quantum dots of the above-described examples, silicidation of the surface of the quantum dots can be performed. Moreover, two types of semiconductors or metals can be used to form the quantum dots.

Furthermore, in the above-described examples, it is possible to form the gate electrode on the device or on the backside of the substrate so as to adjust the charge distribution of the quantum dots.

Moreover, in order to improve the control of the electron state of the quantum dots, a magnetic field can be applied to the device. Further, in order to electromagnetically coupling the quantum dots, the quantum dots can be placed in a cavity or a multiple quantum well structure.

In the above-described examples, pairs of coupled quantum dots are mainly used. However, the number of quantum dots coupled can be three or more. For example, in the fifth example, the number of laminated quantum dots can be three or more.

Further, the device isolation can be performed by Local Oxidation of Silicon (LOCOS), Shallow Trench Isolation (STI), or other methods.

Although a silicon oxide layer is used as a tunnel oxide layer or an insulating layer in the above-described embodiments, a high dielectric constant material, such as SiN, alumina, $HfO_2$, $ZrO_2$, etc. can be used instead. Further, two or more of these materials can be laminated.

The first current path and the second current path may have constricted portions, i.e., so-called the point contact structure. Or, they may be single electron devices.

Although the substrate is a silicon substrate in the above embodiments, it may be formed of glass, STO, GaN, GaAs, etc.

In the present invention, quantum fluctuations or thermal fluctuations of subtle charges have influence on currents flowing through current paths. Accordingly, it is possible to generate high-quality random numbers at a high speed and without a deviation by using the difference in the currents flowing through the currents paths as random number data.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concepts as defined by the appended claims and their equivalents.

What is claimed is:

1. A random number generating device comprising:
a pair of first and second current paths arranged in parallel with each other;
a pair of first and second fine particles which are located in the vicinity of the first and second current paths, and which can mutually exchange charges, at least one of the first and second fine particles being electrically coupled to one of the first and second current paths; and
a random number generator including a detection circuit that detects a difference between currents flowing through the first current path and the second current path, and that generates a random number based on the detected difference.

2. The random number generating device according to claim 1, wherein the first and second fine particles are located between the first and second current paths.

3. The random number generating device according to claim 1, wherein an energy level of charge including a charging energy in the first and second fine particles is discrete.

4. The random number generating device according to claim 1, wherein the diameter of the first and second fine particles is 100 nm or less.

5. The random number generating device according to claim 1, wherein an odd number of the pairs of first and second fine particles are located along the direction of currents flowing through the first and second current paths.

6. The random number generating device according to claim 1, wherein the first and second current paths are formed on a surface area of a semiconductor substrate so as to be separated from each other, and the first and second fine particles are located between the first and second current paths on the semiconductor substrate via a first insulating layer.

7. The random number generating device according to claim 6, wherein the first and second fine particles are covered by a second insulating layer formed on the first insulating layer, and a conductive film to connect with the first and second current paths is formed at side portions of the second insulating layer.

8. The random number generating device according to claim 6, wherein the first insulating layer covers a surface of a trench formed in the semiconductor substrate between the first and second current paths.

9. The random number generating device according to claim 1, wherein the first and second current paths are formed on a first insulating layer on a substrate so as be separated from each other, the first and second fine particles are embedded in a trench formed between the first and second current paths, a bottom of the trench reaching the first insulating layer, and a second insulating layer is formed between the first and second fine particles and the first and second current paths.

10. The random number generating device according to claim 1, wherein the first current path is formed on a first insulating layer, the second current path is formed on a second insulating layer formed on the current path, and the first and second fine particles are formed at side portions of the first current path, the second insulating layer, and the second current path via a third insulating layer.

11. The random number generating device according to claim 1, wherein the first and second current paths are source-drain paths between first and second silicon FETs, respectively.

12. The random number generating device according to claim 1, wherein the random generator includes a differential amplifier.

* * * * *